(12) United States Patent
Otterstrom

(10) Patent No.: US 8,627,913 B1
(45) Date of Patent: Jan. 14, 2014

(54) SYSTEM AND METHOD TO REDUCE THE AERODYNAMIC FORCE ON A VEHICLE

(71) Applicant: Gemini Energy Technologies, Inc., Lindon, UT (US)

(72) Inventor: Gary G. Otterstrom, Lindon, UT (US)

(73) Assignee: Gemini Energy Technologies, Inc., Lindon, UT (US)

( * ) Notice: Subject to any disclaimer, the term of this patent is extended or adjusted under 35 U.S.C. 154(b) by 0 days.

(21) Appl. No.: 13/622,000

(22) Filed: Sep. 18, 2012

Related U.S. Application Data

(63) Continuation of application No. 13/204,802, filed on Aug. 8, 2011, now Pat. No. 8,267,211, which is a continuation of application No. 12/119,073, filed on May 12, 2008, now Pat. No. 7,992,666.

(60) Provisional application No. 60/917,338, filed on May 11, 2007.

(51) Int. Cl.
*B60K 1/02* (2006.01)

(52) U.S. Cl.
USPC .................. 180/69.6; 296/180.4; 180/903

(58) Field of Classification Search
USPC .......... 296/181.7, 183.1, 186.3, 186.4, 182.1, 296/96, 189.03, 208; 180/69.6, 903, 165
See application file for complete search history.

(56) References Cited

U.S. PATENT DOCUMENTS

| | | |
|---|---|---|
| 581,391 A | 4/1897 | Cabot |
| 673,941 A | 5/1901 | Bellas et al. |
| 2,378,810 A | 6/1945 | Thornton |
| 2,503,930 A | 4/1950 | Winkler et al. |
| 2,514,695 A | 7/1950 | Dempsey |
| 2,652,038 A | 9/1953 | Winkler |
| 2,694,387 A | 11/1954 | Winkler |
| 2,745,391 A | 5/1956 | Winkler, Jr. |
| 3,090,458 A | 5/1963 | Wolf |
| 3,374,849 A | 3/1968 | Redman |
| 3,999,797 A | 12/1976 | Kirsch et al. |
| 4,141,333 A | 2/1979 | Gilbert |
| 4,151,824 A | 5/1979 | Gilbert |
| 4,188,925 A | 2/1980 | Jordan |
| 4,206,728 A | 6/1980 | Trenne |
| 4,357,045 A | 11/1982 | Kinford, Jr. |
| 4,460,055 A | 7/1984 | Steiner |
| 4,486,046 A | 12/1984 | Whitney et al. |
| 4,518,188 A | 5/1985 | Witten |

(Continued)

FOREIGN PATENT DOCUMENTS

WO   WO 2005/116418   12/2005

*Primary Examiner* — J. Allen Shriver, II
*Assistant Examiner* — James Triggs

(57) ABSTRACT

Disclosed is a vehicle including a tractor having a lower tractor duct that receives air from the front of the tractor and channels the air through a center area of the tractor and down between a set of rear wheels, a trailer having a lower trailer duct positioned below a cargo space that channels the air in the lower trailer duct between each set of trailer rear wheels and a lower articulation duct positioned near the set of tractor rear wheels that receives air from the lower tractor duct and communicates air to the lower trailer duct. An upper duct channels air through ductwork at the top of the trailer and tractor. A rear trailer louver system enables air in each duct to be channeled and pulled out of each respective duct, reducing drag and eddy currents using the vacuum at the rear of the trailer.

20 Claims, 10 Drawing Sheets

(56) References Cited

U.S. PATENT DOCUMENTS

| | | | |
|---|---|---|---|
| 4,523,558 A | 6/1985 | Maucher et al. | |
| 4,625,821 A | 12/1986 | Aumont et al. | |
| 5,092,648 A | 3/1992 | Spears | |
| 5,280,990 A | 1/1994 | Rinard | |
| 5,322,340 A | 6/1994 | Sato et al. | |
| 5,513,693 A * | 5/1996 | Matsuda et al. | 164/495 |
| 5,513,893 A | 5/1996 | Nakata et al. | |
| 5,846,155 A | 12/1998 | Taniguchi et al. | |
| 5,971,092 A | 10/1999 | Walker | |
| 6,575,522 B2 * | 6/2003 | Borghi et al. | 296/180.5 |
| 6,685,256 B1 | 2/2004 | Shermer | |
| 6,736,447 B2 * | 5/2004 | Angelo et al. | 296/180.1 |
| 6,773,368 B1 | 8/2004 | Williames | |
| 6,786,291 B1 * | 9/2004 | Linden et al. | 180/68.2 |
| 6,932,419 B1 * | 8/2005 | McCullough | 296/180.1 |
| 7,240,958 B2 * | 7/2007 | Skopic | 296/180.1 |
| 2004/0050487 A1 * | 3/2004 | Frantz et al. | 156/304.2 |
| 2006/0103167 A1 * | 5/2006 | Wong et al. | 296/180.1 |
| 2007/0132275 A1 | 6/2007 | Weaver | |
| 2007/0132276 A1 | 6/2007 | Wood | |
| 2009/0096248 A1 | 4/2009 | Moscoco Gomez | |

\* cited by examiner

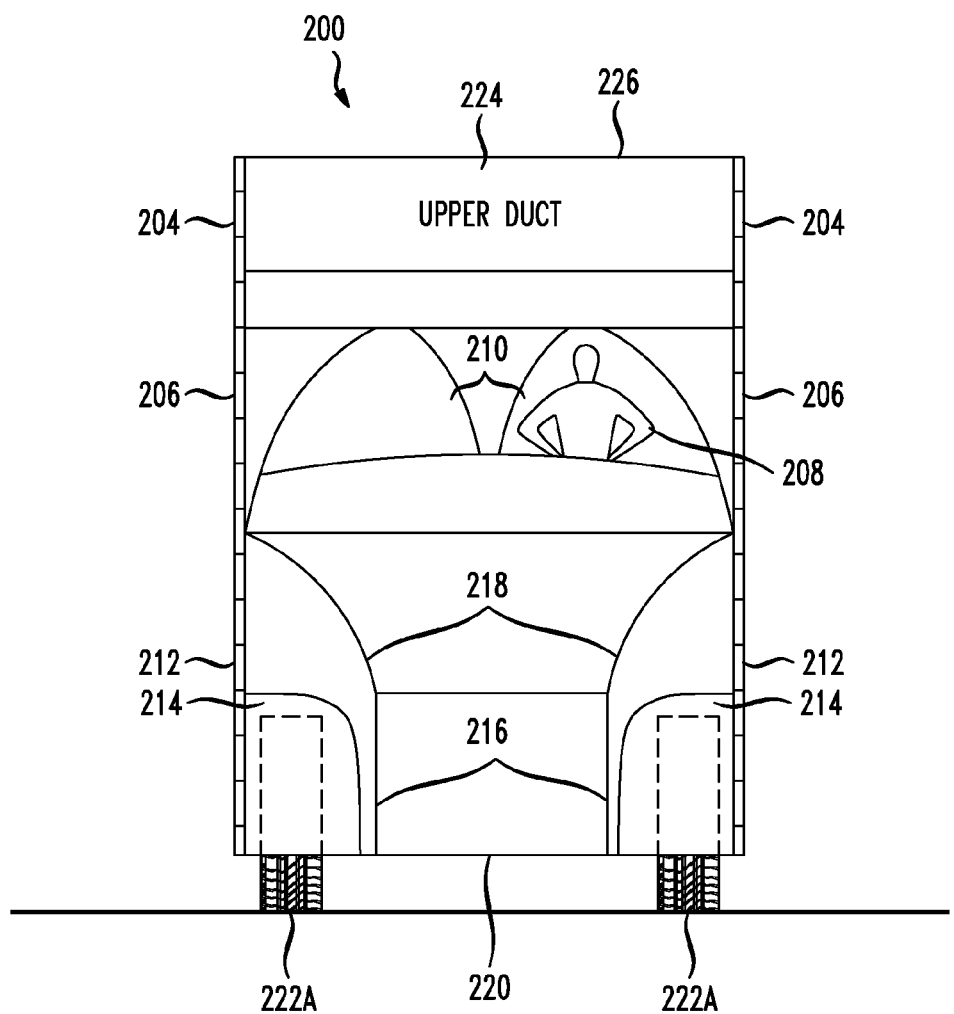

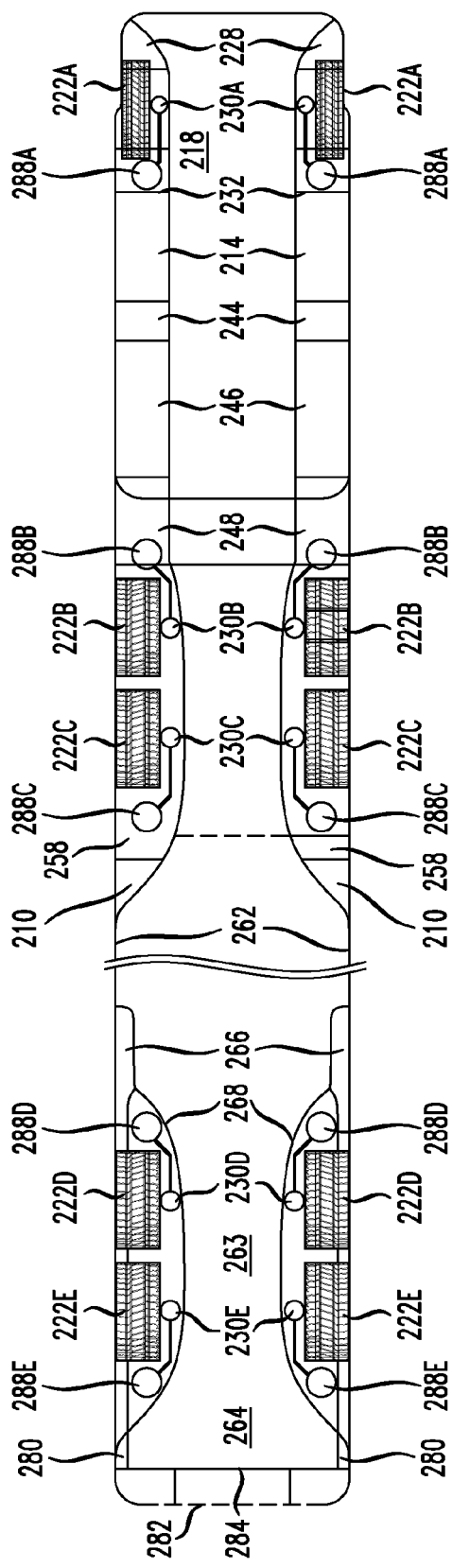

SYSTEM AND METHOD TO REDUCE THE AERODYNAMIC FORCE ON A VEHICLE

PRIORITY CLAIM

The present application is a continuation of U.S. patent application Ser. No. 13/204,802, filed Aug. 8, 2011, which is a continuation of U.S. patent application Ser. No. 12/119,073, filed May 12, 2008, which is the non-provisional of U.S. Provisional Application No. 60/917,338, filed May 11, 2007, the contents of which are incorporated herein by reference in their entirety.

CROSS-REFERENCE OF RELATED APPLICATIONS

The present application is related to U.S. patent application Ser. No. 11/132,843, filed on May 19, 2005 and U.S. patent application Ser. No. 11/530,151, filed on Sep. 8, 2006. These applications are incorporated by reference in their entirety.

FIELD

The present invention relates to an aerodynamic design for a vehicle and more specifically to tractor trailer design in which an aerodynamic air duct is positioned to enable air to flow through the center of the tractor and through the trailer.

BACKGROUND

Class 8 Semi Tractor/Trailers and other large class trucks have seriously poor aerodynamic characteristics, particularly at highway and freeway speeds. These poor aerodynamic characteristics contribute to extremely poor fuel economy as more than 50% of the horsepower of the wheel drive energy goes towards overcoming the aerodynamic drag on large body trucks. This is particularly true of Class 8 Semi Tractor/Trailers with full size trailers.

In general, these trucks have very poor aerodynamic characteristics, particularly at high speeds over 55 mph. Also, it is known in the industry, that more than 50% and indeed as much as 60% of the horsepower it takes to drive a Semi Tractor/Trailer down the road, 50-60% of that component goes to overcoming aerodynamic drag. That is a very serious problem in that it reduces gas mileage considerably. Overcoming these inefficiencies and losses due to poor aerodynamics even in a small way leads to substantial savings when multiplied across many thousands of trucks driving across the country every day. FIG. 1A illustrates a traditional tractor and trailer combination 100. Of the 689 HP channel in the engine 25 HP is used by internal components, 75 HP is used for cooling and 60 HP is lost to transmission 106 heating. 273 HP is lost to the atmosphere through exhaust. Of the 400 HP on the test bench, after atmospheric losses, 300 HP is delivered to the flywheel and 240 HP is delivered to the drive line 508. Then, 240 HP is delivered to the tires on the road. 144 HP goes into over coming aerodynamics and 96 HP into tire rolling resistance. Of the 144 HP to aerodynamics, 58 HP is in front aerodynamics, and 50 HP on rear drag and 36 HP on surface friction. What is needed in the art is a mechanism to improve fuel efficiency in vehicles.

SUMMARY

The present invention generally relates to vehicles and more specifically relates to a system and method of providing a split engine aerodynamic design for a Semi Tractor/Trailer system. The principles of the disclosure may be applicable to any type of vehicle, but the preferred embodiment is shown in terms of a Semi Tractor/Trailer.

The invention generally relates to system and methods for providing a split engine, hydraulic transmission aerodynamic vehicle. The preferred embodiment of the invention comprises a Semi Tractor/Trailer having a split engine design in which there are two engine blocks that are physically separated and preferably positioned on the left and right hand portion of the cab. Each of these split engines drives a hydraulic pump. A hydraulic transmission communicates with each of the respective hydraulic pumps and provides a mechanism for converting the rotational energy from each of the respective split engines to hydraulic pressure which is used to drive hydraulic motors associated with each of the wheels of the vehicle. A computerized control system communicates with the various elements including the engine, various sensors throughout the vehicle and the hydraulic pumps and motors in order to control the vehicle. The vehicle also comprises at least one air flow duct. Preferably, a first air flow duct flows in between the split engines in the lower portion of the cab and the air flow duct is continuous from the tractor and through a mechanism for maintaining the channel through a lower portion of the trailer and providing an exit pathway for the air at the rear of the trailer. An optional secondary air flow duct is defined at an upper portion of the vehicle and preferably includes an opening at the portion of the top of the cab. A mechanism is used to maintain the channel through the cab and a top portion of the trailer such that the air can exit out a rear portion of the trailer.

The present disclosure also includes a computer system having basic hardware components such as a central processing unit, memory, a hard drive, a bus and other communication means for communicating the functionality of a computer program to the various components of the system. Such a control system would be known by those of skill in the art and all such hardware components and communication means, sensors, feedback loops and control valves and mechanisms are generally known to those of skill in the art and further details are not provided herein but may be added via amendment without adding new matter to the present application.

This invention will greatly reduce the aerodynamic drag coefficient of a standard class 8 semi tractor/trailer configuration, thereby reducing the wheel drive horsepower. This reduction in required horsepower to maintain highway or freeway speed will result in substantial savings of fuel. The concepts disclosed herein will produce a very substantial savings in horsepower and in fuel when these trucks are driven at highway and freeway speeds, which these trucks spend a great portion of their life going over 50 mph, sometimes over 60 mph, and they travel many hours a day on the roads.

Another embodiment of the invention may comprise a computer readable medium such as a hard drive, compact disc or other physical medium which may store a computer program for controlling a computing device to perform the various control functionality generally described herein to enable the operation of one or more components of the vehicle. Such control programs and mechanisms are implementable by those of skill in the art with the basic details of the inventive functionality disclosed herein.

BRIEF DESCRIPTION OF THE DRAWINGS

FIG. 2A illustrates a front view of a truck according to an aspect of the disclosure;

FIG. 2D illustrates a bottom view;

DETAILED DESCRIPTION

Figure 1A:
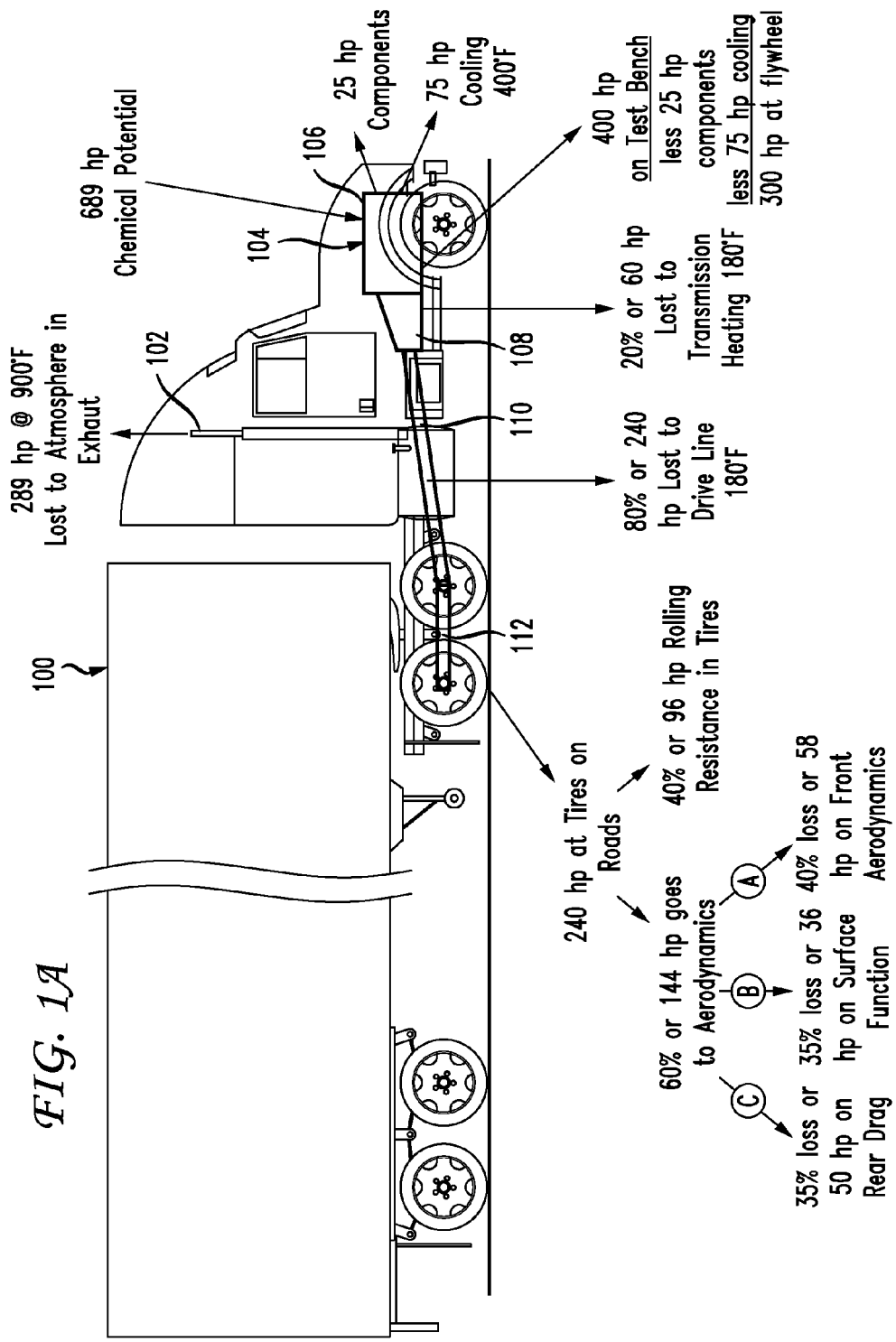
FIG. 1A illustrates the horse power lost on a typical class 8 truck through the various components.

The following provides a discussion of the preferred embodiment of the invention. As has been noted, however, the general principles disclosed here can applicable to any vehicle whether a truck, a snow-based vehicle, air-based vehicle and so forth. The preferred embodiment will be disclosed with reference to a tractor/trailer system but, as can be seen, the basic use of a split engine hydraulic transmission wherein an air duct flows between the split engines as a basic component of the present disclosure may be applicable in many other contexts. The following description will be with reference to the various figures and numbers referenced in FIGS. 1A-4.

Aerodynamic drag on a standard configuration Class 8 truck as shown in FIG. 5 falls into five basic areas: 1) The brunt force of the semi tractor/trailer as its nose moves forward through the ambient air at high speeds. 2) The frictional eddy forces that develop roll down along the sides and the top of the semi tractor/trailer's surfaces as a result of the disruption of the air that gets diverted off the nose. This causes the air off the nose to interrupt the air that normally flows by the front of the truck. The air off the nose receives a force away from the truck which falls back into eddy currents, which start to roll as they try to correct themselves and impact the truck. Eddy currents roll down the side of the truck which takes energy. Any time you put energy into a truck and energy into creating eddy currents, the eddy currents require energy to be corrected. 3) The eddy current air from the brunt force of the tractor that collapses between the road and the under side of the trailer and churned by the wheels and other non-aerodynamic attachments under the trailer. Anytime particularly vertical surfaces exist with voids behind them, as is under the truck and behind the truck, (#3 is in regards to under the truck) these voids, as they move vertically through the ambient air, create a vacuum behind themselves. So eddy currents and air will swirl and find a way underneath the underside of the truck, bouncing off the wheels, churned by the wheels, and bouncing off other non-aerodynamic surfaces on the truck creating a drag situation. This is observable when it rains, where one can see the swirling pattern in the fog of the rain as raindrops bounce off the wheels. 4) The turbulence that develops in the gap between tractor and the trailer as air gets into this vertical surface and bounces around, forms eddy currents and comes back out. Whatever air goes into this cavity has to come back out. Going in and coming out takes energy and when it comes out it also creates forces that disturb other air, causing more energy losses. 5) Drag develops behind the vertical surface of the end of a semi tractor/trailer as this surface moves forward and through the air. A large envelope vacuum system is developed and eddy currents behind the truck have to be continually collapsing and forming. As this surface moves at 60-70 mph through the air, it creates a tremendous vacuum and energy is further wasted if a difference of even a few PSI exists between it and the surrounding air.

The ambient air is typically at 14.7 PSI and as this surface experiences even two PSI lower than ambient, multiply by the number of square inches on the surface of the truck, which could be greater than 20,000 square inches. This 8×12 foot square vertical surface and that number of square inches multiplied by the delta PSI that amounts to a very large force. Sometimes over 40,000 pounds.

This disclosure uses a special configuration of ducts and tractor/trailer components to mitigate and reduce the above five areas of aerodynamic drag. The basic configuration and operational function of the class 8 truck semi tractor/trailer remain basically unchanged by the described modifications, such as driver ergonomics, loading, unloading, dock heights, cargo configuration, docks and maneuvering of the truck. Generally, the structure used for fueling, unloading and loading these trucks, etc., will not change with this configuration.

Pollution will be reduced because the amount of carbon dioxide emission and the amount of fuel burned per mile and carbon output per mile will be greatly reduced. Because of the unique configuration of this engine and drive components, the operational reliability weight of this tractor/trailer will be increased and the weight will be decreased. Serviceability of this configuration of engine and dive train components will be greatly increased. This is due to the fact that the motors and drive are relocated in this truck such as they are more accessible to mechanics and they are modularized such that they can be quickly disconnected and reconnected to the point where service might be able to be performed on the road, rather than in a shop, with interchangeable components from a service vehicle. In particular, this truck replaces the gear transmission with a hydraulic transmission system, which also saves weight. Companies like Superdrive, Inc. have known hydraulic transmission technologies that may be applicable. Stability increases because the engines are separated. This is a twin engine system with a single or multiple drive system or dual integrated drive system such that the components utilize the split engine systems to increase reliability. One of the unique characteristics of this is that this truck will be able to tow itself. If one engine breaks down, the other engine can still tow this truck at low speed to a location where it might be able to get fixed, or to at least get it off the road. Another advantage is that the engines are moved away from center distributes the mass of the engines, allowing for greater stability. Between being lowered and being placed out board, the centroid and the center of gravity are shifted down and out. Furthermore, the stability of the truck is increased because this truck does not have a geared engine, like the transmission, but it has hydraulic pumps. The transmission and on through the body that causes the truck to lurch and to rock back and forth as it changes gears is mitigated by the fluid transitional flow of hydraulic pumps and the hydraulic drives. Standard diesel fuels or standard bio-diesel fuels can be used in this new truck.

FIG. 2A illustrates a front view of the truck 200. Feature 220 represents the nose opening of the lower duct and it is fashioned to a square duct, with aerodynamic leading edges. The square opening fits the standard width of a class 8 semi tractor. This opening allows air to enter the tractor/trailer 200 at the front of the truck the energy that puts its air into the truck is derived from the truck from the tractor/trailer moving down the road by using the horsepower and the engine to push the truck through the oncoming ambient air to enter as the tractor/trailer moves down the road and highway and freeway speeds or other speeds. The lower ducts are completely enclosed. The lower duct and an upper duct are completely enclosed to enable fresh air entering these ducts to become pressurized in the ducts. It does not create a lifting problem with these trucks because the air pressure is distributed equally everywhere in a cross section of the duct. Because the pressure is felt equally everywhere, there is no lifting surfaces per se in the interior of these ducts. The edges of the ducts are aerodynamic leading edges; they cut through the air. This is an important component of these ducts because this structure attempts to have as much air as possible that passes the front of the truck get cut with the air either going into the ducts or the air either passing on the outside surfaces of the truck. The purpose for this is to maintain air flow down the side of the truck 200 undisturbed with a thin boundary layer. This is important because undisturbed and thin boundary layers require less energy. The disclosed truck 200 stream lines the air flow layers as smoothly as possible and as far as possible down the side of the tractor/trailer 200 before they start to pick up turbulence. This approach saves energy.

Feature 212 illustrates a laminar flow register. It allows all excess air not capable of passing beyond the 200 truck to flow outside of the truck in a high speed laminar flow pattern. The laminar flow register can be automatically adjusted for vehicle speed and air pressure.

Feature 218 illustrates a portion of the truck 200 that is tapered in order to force the intake air to go into compressional laminar flow, so that the whole volume of intake air can move through a smaller constriction down line. The control surfaces are shaped so as to accomplish this in the most efficient manner. Although this process requires energy input from the tractor/trailer 200 moving through the ambient air, other energy savings are netted back because most frontal air from the nose of the tractor is no longer forced to change directions around the tractor/trailer and the sides of the tractor/trailer have a much greater chance of moving through the ambient air with out disturbing it into larger eddy currents. This keeps the boundary layer between the ambient air and the side surfaces of the tractor/trailer as small as possible, thus reducing energy fluid flow energy losses. A port can be constructed to take off air that is compressed, for example, above 1 atmosphere as a charging duct for engine intake combustion air thus improving the compression ratio characteristics of the engine. The exhaust passes heat into the second cycle energy recovery system incorporated herein by reference. After extracting energy, the exhaust can be returned to the lower duct. This will be at a higher ambient temperature and pressure and which will aid in air flow characteristics to the back of the trailer thus enhancing the performance of disrupting the vacuum and also temper the air in the duct to aid in reducing snow and ice buildup because of its temperature. The lower and upper duct will have a heating system as mentioned above to de-ice critical icing points to keep it free from ice and snow.

Feature 216 is a transitional duct that conducts the air flow between the drive tires 222A area. The duct 216 also forms a structural member to support the drive tires 222A and is integral to the tractor structural frame 231. As this duct 216 has a smaller cross-sectional area than the opening of the duct (220) the air flow in this region will speed up and its pressure will drop in accordance with the Bernoulli principle. Air in this entire duct system cannot provide any aerodynamic lift to the vehicle relative to the ground, because the duct is enclosed and all internal duct surfaces have equal pressure impinging on them.

Figure 2B:
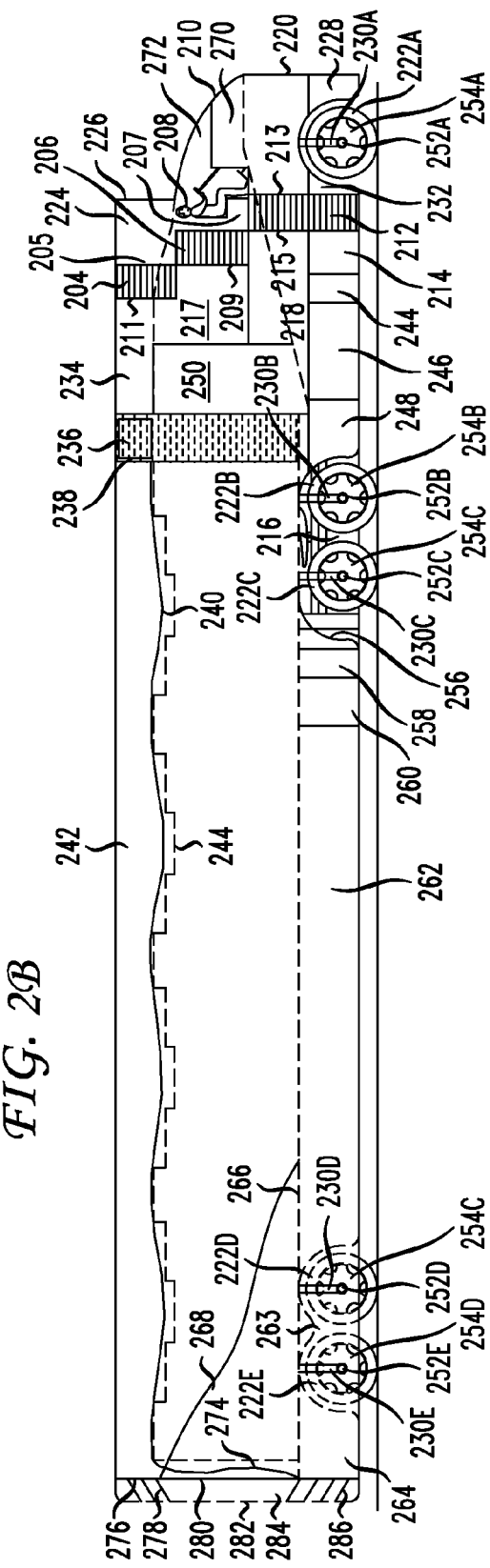
FIG. 2B illustrates a side view of a proposed truck.
Figure 2C:
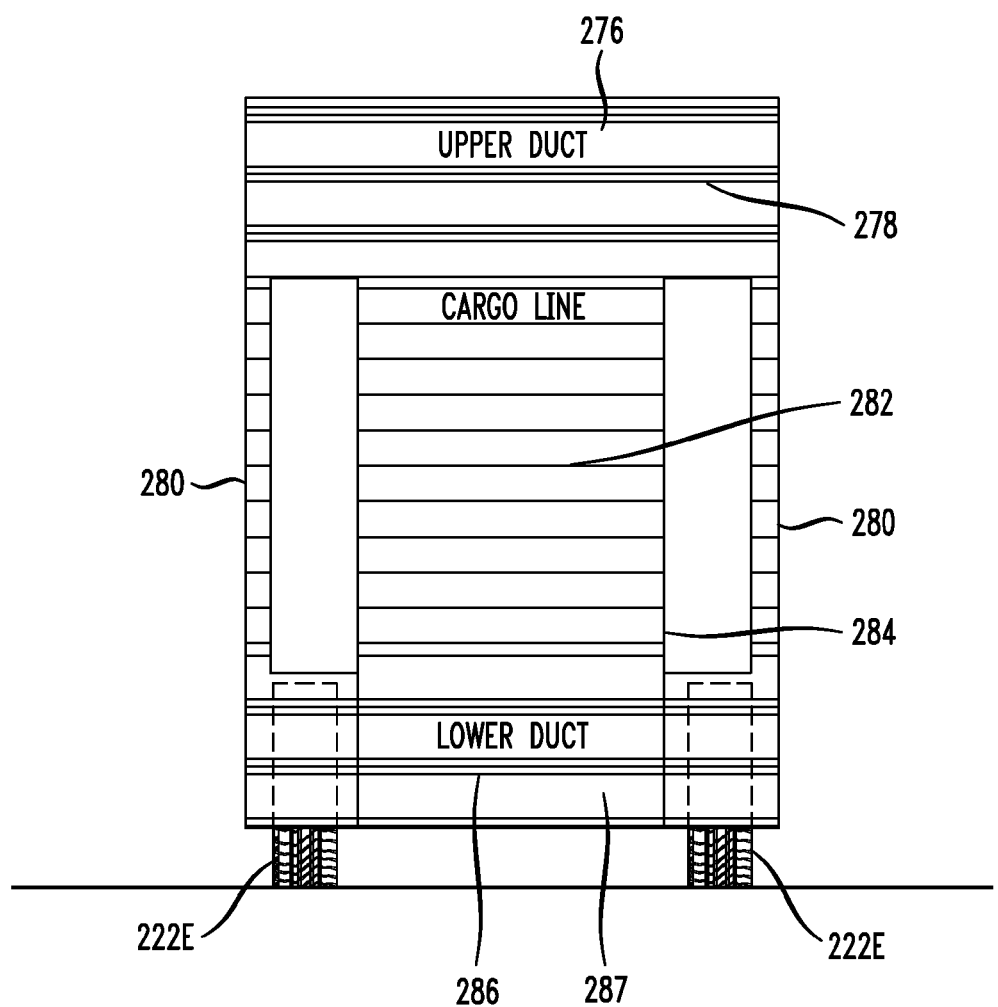
FIG. 2C illustrates a back view.

Viewing feature 218 in FIG. 2A and FIG. 2B, the transitional nature of this duct is shown as a duct funnel that causes the compression. Undisturbed air that enters duct 220 will flow for a while until it flows to and through duct 218 which will force the air into compressional laminar flow. Duct 218 has the purpose of constricting and compressing the air. The energy to do this is provided by the truck moving forward. Feature 216 is the throat or the square duct 216 that follows duct 218 as shown between the tires 222B and 222C in FIG. 2B. This duct 216 provides a square consistent restriction through the back tires 222B and 222C. Thus, the air flows from duct 220 to duct 218 to duct 216. Once in duct 216, it enters a Bernoulli shape. The air in this constriction state is 4 to 5 times smaller in cross-sectional area, so the air will increase in speed substantially.

As the air goes through this Bernoulli shape, the Bernoulli principle states that air flowing through a Bernoulli shape will, in order to speed up, reduce its pressure and move faster.

Figure 1B:
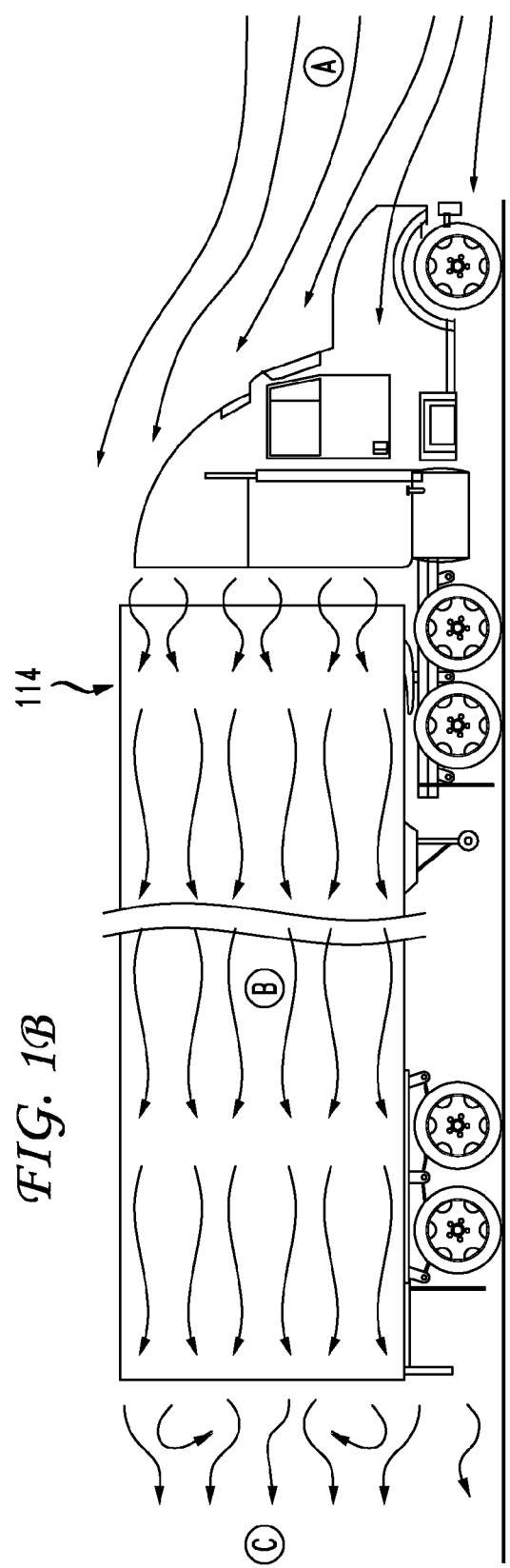
FIG. 1B illustrates a standard aerodynamic drag on a class 8 truck.
Figure 1C:
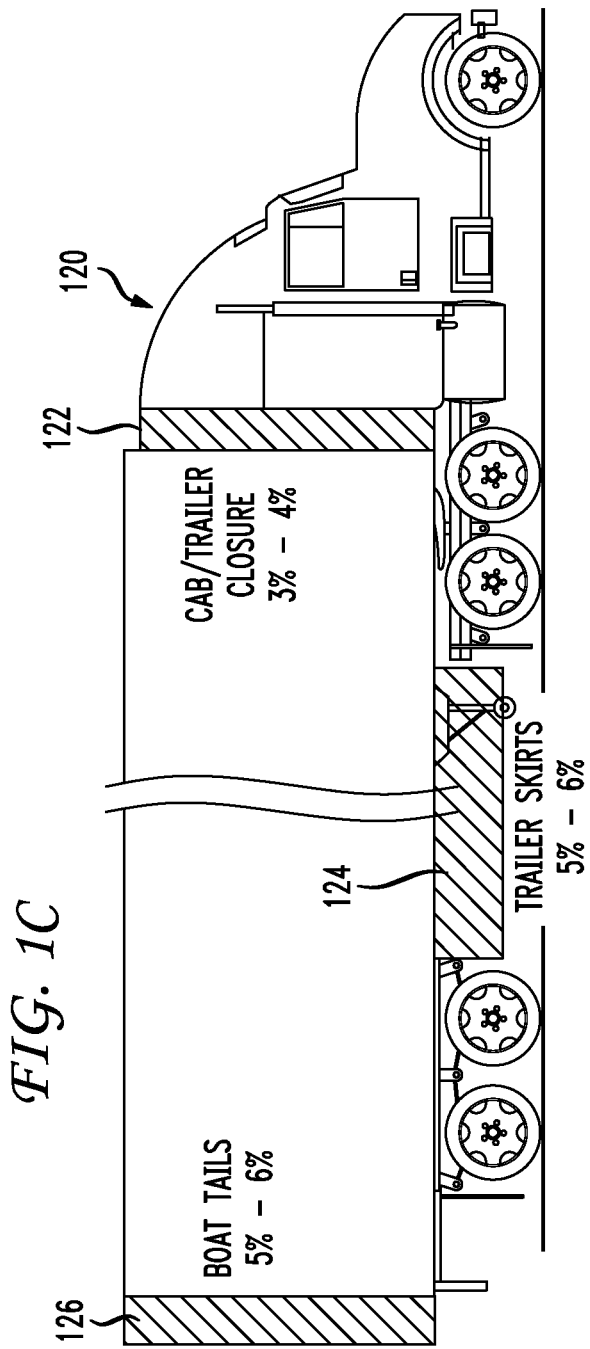
FIG. 1C illustrates prior art aerodynamic drag reduction efforts.

FIG. 2A also illustrates a lower duct laminar register 212. The lower duct laminar register 212 is designed to process overflow air that cannot be processed by ducts 220, 218, 216 any air that can't be processed by that system will bypass into the laminar flow registers 212. The purpose of these laminar registers 212 is to allow excess air to flow into a laminar grill and be ejected out the sides of the truck in a controlled manner. FIG. 2A and FIG. 2B illustrate a high speed laminar flow configuration. This process costs some energy, but it allows air sheering by the air that travels down the outside of the truck. This air sheers by and passes the nose of the truck undisturbed in a laminar flow air at higher speeds than the truck speed. The laminar flow at speeds faster than the truck speed is joined with the bypassing outside air. This causes a minimal boundary layer or a minimal eddy current formation on the outside of the truck. The purpose of this in general is to move as much air as far down the tractor/trailer 200 as possible before it starts to develop turbulence and to pass as much air as possible through. Ducts 220, 218 and 216. In general, this represents a net savings of energy, rather than bouncing all the air off of a traditional standard truck configuration as shown in FIG. 1B.

Feature 256 in FIG. 2B illustrates a lower duct articulation device that articulates between the tractor duct 216 and trailer duct 262. This articulation device 256 allows for continual air flow between duct 216 and duct 262 at relatively low articulation angles, this is usually when the tractor/trailer is at highway and freeway speeds. When at low speed and at turning and backing maneuvers the articulation device is automatically disconnected then reconnected. The device 256 is a place of articulation between the tractor and the front, lower section of the trailer lower duct. This device allows for articulation at high speeds. Traditionally a tractor/trailer going 50 mph and above has less than a 7 degree angle of articulation for traveling down a highway. This disconnect is a smooth, circular and large radius circular device. It allows for the duct to swing back and forth at high speeds. It has a small grommet system for engaging the air to seal it off. This grommet can be broken at will, it can be broken at the end of a rapid turn, physically or it can be withdrawn electronically. It has a physical disconnect, a safety disconnect and it has an electronic disconnect so when the truck speeds get below a certain level, it will automatically disconnect and it poses no safety danger in overcoming articulation. After air enters through this seal, it expands through this Bernoulli movement and it will start to slow down and it expands into a larger duct 262.

As shown in FIG. 2B, the trailer duct and features smooth aerodynamic transitions at the articulation point and at the rear trailer wheels. This duct is enclosed and transfers air flow to the rear of the trailer. This duct also acts as an integral continuous surface with the trailer sides and removable access covering for the wheels to form an over all aerodynamic surface for the tractor/trailer to pass through the ambient air, with minimal boundary layer effect. This is the full size duct of the trailer. Duct 262 has a greater cross-sectional area than duct 216 does. The air speed will reduce in duct 262 and this is good because as this air travels through this entire duct system, it experiences frictional losses on the surface and frictional losses take energy. But they take less energy because the air is in compressional laminar flow, so the air takes less energy than if it flows on the outside of the vehicle. So by flowing on the inside, there is a penalty in frictional losses of the interior surface but the penalty can be compensated for.

By allowing the surface area to increase, some of the frictional flow can be overcome. Duct 262 also serves an important purpose by forming a skirting for the trailer that goes all the way down to within 11 or 12 inches of the surface for the road. The 11 or 12 inches is a minimal requirement for trucks to travel down roads. This forms another function by streamlining and keeping the air from circulating underneath the truck. The design improves the air flow by really being a duct and not a winglet as in the prior art. The design serves a dual purpose of helping to streamline and to transmit air internally. The air in duct 262 reaches another duct and it comes to a second Bernoulli shape and it flows through a second Bernoulli shape 263). Again the air pressure will drop, the air speed will pick up, but the air is starting to lose energy from frictional losses inside this duct. But the structure gains something important in the lower point of 262 and the rear point of 263. At this point, part of the duct starts to experience the pull from the vacuum at the rear of the truck from the exit of this duct 264 and 266. Features 244 and 266 are exit points for duct 256 and 263.

Feature 263 is an aerodynamic Bernoulli type duct that allows the air flow to move smoothly around the rear trailer tires 222D, 222E. This allows the air to speed up and the pressure of the air to drop so as to promote equal the flow in this constriction. This duct 263 also doubles as a structural member supporting the rear tires and the trailer frame.

Feature 266 picks up air prior to the Bernoulli shape in a shaped vent that receives air and helps reduce the pressure of air from frictional losses as air goes through the Bernoulli shape associated with the rear wheels. This is a grading shaped duct that receives air at a point just before the tire 222D and channels the air into an expandable duct 268. Duct 266 is a thin duct, preferably 3 to 4 inches or other widths, but it expands in a vertical direction as it goes backwards. Air exits at feature 280, which is a set of exit registers that are vertical positioned along the exit edges of the back of the truck.

The air flowing through duct 266 flows backwards and exits the rear of the truck in the opposite direction of the travel of the truck. Since the vacuum is high at the back of the truck, the vacuum can pull air through duct 268. Air, in turn, is pushed by the force of air flowing down the main lower duct air through the shaped vent at 266 and so air passes under and then at the rear of duct 268 and then is pulled by vacuum through the exit vertical registers 280. This structure relieves air pressure in the lower duct that is building up by frictional force and distributes air, breaks down eddy currents and breaks the vacuum at the rear of the truck along vertical edges. This portion of the trailer does not process a great amount of air, but it is very fast moving air and this approach helps with the air foil as air tries to go around the back and collapse around the back of the truck. The structure performs an important function to keep the air flowing straight so that it has to provide air to fill the vacuum in as it were.

Feature 256 is a place of articulation between the tractor and the front, lower section of the trailer lower duct. This articulator 256 allows for articulation at high speeds. Traditionally, a tractor/trailer going 50 mph and above has less than a 7 degree angle of articulation for traveling down a highway. This articulator is a smooth, large radius circular device that allows for the duct to swing back and forth at high speeds. It has a small grommet system for engaging the air to seal it off. This grommet can be broken at will, and can be broken at the end of a rapid turn, physically or it can be withdrawn electronically. It has a safety disconnect as well as an electronic disconnect so when the truck speeds get below a certain level. In this case, it will automatically disconnect and it poses no safety danger in overcoming articulation. After air enters through this seal, it expands through this Bernoulli shape and then will start to slow down and it expands into a larger duct.

Air that is drawn out of feature 264 may be channeled into two places. It goes into louvers 286, which is a series of lower duct louvers which distribute the air along the lower third or so of the back of the truck and starts the vacuum and fills the vacuum in with a high volume of air. Air from 264 also travels up what is called the snorkel duct 284 which is a vertical duct that goes up the center of the truck. It also acts as a cargo bulk head, i.e. it helps to keep the cargo in. It is positioned like the closing of a door and acts kind of like the rear door to holds the cargo in. The bulk head on the back surface facing the cargo holds the cargo in the cargo space. On the front surface, it has a series of louver registers that spread air out across the back of the truck. The snorkel duct 284 experiences the full center of the vacuum that is on the back of the truck. The vacuum at the back of these louvers pulls air through the snorkel duct 284 so that air is both being pulled through the snorkel by vacuum and pushed through the snorkel by pressure from 264.

Feature 264 is the rear trailer duct that is a continuation of duct 263 and distributes the continuous air flow over the width of the back of the trailer. The back vertical surface of a trailer is many thousands of square inches in area (usually the rear doors area). This surface moves forward through the ambient air creating an envelope of reduced pressure air behind this reduced pressure air, a partial vacuum applied over several thousand square inches of the vertical surface area is a very large drag force. The air exiting the lower duct has the physical ability to fill in this vacuum, thus equalizing the pressure and extinguishing the force. In order to be the most effective at reducing the rear drag force the duct air needs to be distributed across the entire rear vertical surface.

Feature 264 is the expansion of the Bernoulli shape. This expansion also starts to feel a powerful effect of the vacuum from the back of the truck (vacuum bubbles). Air is pulled out of duct 264 and goes into two places. It goes into structure 286, which is a series of lower duct louvers which distribute the air along the lower third or so of the back of the truck and starts and fills the vacuum in with a high volume of air. Air from louvers 286 also travels up what is called the snorkel duct 284. The snorkel duct 284 is a vertical duct that goes up the center of the truck. It also acts as a cargo bulk head; it helps to keep the cargo in. It is positioned like the closing of a door and acts like the rear door. It holds the cargo in, the bulk head on the back surface facing the cargo holds it in. On the front surface, it has a series of louver registers that spread air out across the back of the truck. The snorkel duct 284, the opening in the louvers, experiences the full center of the vacuum that's on the back of the truck. The vacuum at the back of these louvers pulls air through the snorkel duct 284, so air is both being pulled through the snorkel by vacuum and pushed through the snorkel duct 284 by pressure from duct 264. There is a diversion of air as well. Duct 264 splits the air into two flows, it goes out rear registers and it also has a function that air is pulled through.

This lower duct 284 enables the overall energy savings to be quite large because the net effect is that although the air experiences internal friction at a certain cost, the air experiences a cost to compress this air, there is a payback in the vacuum sucking it out.

Louvers 286 attached to the exit of the lower duct distribute the air to the lower portion of the back surface of the trailer. This air in turn reduces the drag force on the rear vertical surface of the trailer. The forming vacuum at the rear of the trailer actually helps pull the air out of the rear of the lower duct and thus helps overcome the internal surface drag coefficient and thus reduces the horse power required to compress the air at the front intake of the lower duct.

The snorkel duct 284, discussed above, communicates air flow from the exit of the lower duct to a set of distribution louvers up the vertical center area of the rear trailer surface. The purpose of this duct is to deliver air flow across the rear vertical surface of the trailer in order to break the vacuum and thus the drag force on this surface. The vacuum drag force is at its highest at the center line of the trailer vertical surface, because ambient air has the greatest distance to go to flow around the edges of the trailer and fill into the center of the vertical surface. This drag force creates a very large pressure differential to pull higher pressure air out of the lower duct and up the snorkel duct and be distributed on the vertical surface.

Feature 282 shows tune-able distribution louvers of the vertical snorkel duct 284. Small ducts 280 communicate small flows of air between the lower duct forward of the rear trailer wheels to the vertical expansion duct 268. The purpose of this process is to provide some tune-able pressure relief to the lower duct caused by internal surface friction. Vent 280 picks up air prior to the Bernoulli shape in a shaped vent that picks up air and helps reduce the pressure of air from frictional losses as air goes through this Bernoulli shape. This is a grading shaped duct that grabs air at a point just before the tire and it introduces it into an expandable duct 268, it's a very thin duct, probably 3 to 4 inches, but it expands as it goes backwards and expands and it goes vertical. It's a vertical duct and it exits at feature 280 at the back of the truck. Feature 280 is a set of exit registers that are vertical along the exit edges of the back of the truck. These vertical ducts 280 run along the backside surface of the truck. The air flowing through the duct 280 flows backwards and exits the rear of the truck. It exits in the opposite direction of the travel of the truck. The vacuum pressure is very high at the back of the truck, so there is a vacuum at 280 that pulls air through 268. Air, in turn, is pushed by the force of air flowing down the main lower duct air through the shaped vent at 266 and so they enter under pressure at 268 and then at the rear of 268. They are pulled by vacuum through the exit vertical registers 280. So in general, the system 266, 268, 280 relieves air pressure in the lower duct that is building up by frictional force and it also distributes air, breaks eddy currents and breaks the vacuum at the rear of the truck along vertical edges. Although it is not a great amount of air, it is very fast moving air, it helps with the air foil as air tries to go around the back and collapse around the back of this truck, coming down the sides, it performs an important function to keep that air straight so that it has to provide air to fill the vacuum in as it were.

The vents 266 are connected to a thin vertical expansion duct 268 on each side of the cargo payload. This duct transports air at higher pressure to the exit of the expansion duct 280.

Feature 280 is the thin vertical exit louvers at the end of the expansion duct 268. These louvers distribute air into the vertical sides of the rear surface of the trailer thus aiding in the reduction of drag forces at the vertical edges of the rear trailer.

Computer system 270 is shown in FIG. 2B in the cab. It may be in any location of the truck. The dotted lines show communication with the computer 270, which is any computing device. There are various sensors for air pressure and flow and temperature or any variation of these. The computing device 270 also controls valve activators and other control mechanisms. The dotted lines virtually go to every controlled device. Features 215, 209, 211 are actuators and features 213, 207 and 205 are sensors. Sensors, actuators and other devices provide feedback to the computer 270 to protect the condition of air and to modulate the venting and the opening and closing of vents and those kinds of things to keep the air flowing based on changing conditions.

Sensors 213, 207, 205 sense air conditions and then open or close the laminar flow registers 215, 209, 211.

Cab 210 is the aerodynamic operators cab canopy. Its purpose is to force ambient air up and around to the sides of the canopy. The canopy also increases visibility for the operator. Feature 210 is actually the nose cone. The nose cone can be formed in various ways, not necessarily the way shown here. The nose cone can be formed in various ways to augment ergonomic conditions for the operator to find the best ergonomic views. Air hitting 210 courses down the sides of the nose cone and across the top. The upper duct has an opening that constricts ⅔ of its original opening in 224, in the constriction duct, and it compresses the air down to 30% less volume. And then there is a register at 204 that takes all overflow air that cannot be pressurized through this system of upper ducting, if it cannot be compressed and passed on, then it enters the laminar flow register which relieves this pressure. These laminar flow registers work by a sensory feedback system that allow a detection of air flow pressure in the duct as well as air wanting to come back out the front of the duct and doesn't allow that to happen. The air to a point where all the air has to enter the duct and either exit going down through the duct or exit through the laminar flow register. All of these laminar flow registers are electronically controlled to open up little openings within the duct to either relieve excess air or close down to force all the air through the ducts.

The idea is to sheer the front of the truck so that as much air as possible gets as far down the truck as possible in laminar flow. And the system pays a little price on the front, but the air has to bounce off the front of the truck anyway. If it has to bounce off the truck, it causes a lot of disruption to the boundary flow layers. It spreads out into the ambient sides of the air and disrupts a lot of ambient air and you pay a price for that. Since the frictional price to hit the air and smack it head on is already paid, this design makes the air act in a desirable way, making the air flow in ways that will get larger payback.

Feature 226 is the entry to the upper duct 224. Some low profile semi tractor/trailers may not be configured for this duct but most will as they need headroom margin to load trucks. It preferably has sharp edges to cut the air and begin laminar flow. Feature 224 is the constriction duct where direct ambient air and air from the canopy is compressed. Feature 204 is a laminar flow register. It allows all excess air not capable of passing from the entry 226 to the compressor duct 224 to flow out of the duct in a high speed laminar flow pattern. The laminar flow register can be adjusted for air pressure and vehicle speed. This helps assure laminar flow on the sides of the tractor/trailer for this overflow air.

Feature 234 the transfer duct to convey air flow from the transition duct 224 to the articulation duct 238. This lower duct articulation device 236 allows for articulation between the tractor duct 234 and the trailer duct 242. This articulation device allows for continual air flow between duct 234 and duct 242 at relatively low articulation angles, this is usually when the tractor/trailer is at highway and freeway speeds. When at low speed and at turning and backing maneuvers the articulation device is automatically disconnected then reconnected when favorable conditions are present. The air continues on across the top of the cab over in duct 234. Then it meets another transitional duct 238 which is another articulation duct. It has a very long radius of turning and allows it to freely turn in articulation but it also has a grommet device that will seal at high speeds, it can be broken away easily with no effort in an emergency and it can be electronically inserted to seal off the duct from air flow in a high speed normal operation.

Duct 242 exists above the cargo space and transfers air flow to the rear of the tractor. A cargo membrane 240 weather profs the cargo from the elements. The rear cargo membrane 274 and cargo membrane 240 are attached and sealed to the sides of the trailer and are moveable in order to allow for loading head room. After loading the flexible membrane is lowered as much as possible to create the maximum duct size without damaging the cargo. The duct continues on into duct 242. Duct 242 adds two features. The first is that duct 242 appears to allow the air to enter the cargo space of this tractor/trailer, but indeed trailers have to have a reasonable fluctuation of head room. Not very often do they take up their entire head room with cargo because of weight considerations, usually the weight fills up and there's space at the top. But they had to have space to have maneuverability with the fork lift to raise the tines of the fork lift up and down to load trucks. After the cargo is positioned, a heavy sealed membrane is lowered down onto the cargo surface and stretched over the cargo surface and battened down so that there is an air space. Typically trucks have about 24 inches of room at the top. So, most of the trucks haul a density of weight and materials such that this head room is not sealed up, this back haul sometimes completely empty or almost empty trucks. The small back haul cargo, so it's quite easy to obtain this two feet. This rear membrane 274 also drapes over the back and completely seals off against the sides. It has a lowering mechanism that allows it to tent up and down for loading characteristics. It has preferably Velcro seals or other fasteners to seal against weather, such as against rain along the edges of it to allow water drain out. Other seals may be used as well. So even though it appears that water is allowed to enter the duct, it's really a sealed membrane. A lot of trucks have the framed box of the trailer with just a membrane on a frame and that's becoming very common for weight saving. The upper surface of the trailer is also a membrane.

The ceiling surface is also a membrane and it is allowed to bulge. It is allowed to bulge a few inches in pressurization so that air that's sent into duct 238. If it's high pressure, it will allow this membrane to bulge a little bit, perhaps as a few inches. It will actually increase in aerodynamic shape, because if there is a curvature on the front of the truck, it actually helps maintain a proper shape. If there is a curvature along the long surface like this it helps maintain laminar flow. As the air goes on the outside of the truck, it actually forces it into more of a laminar flow then it relieves itself as it goes out the back end.

Feature 276 is the exit to the upper duct 242 it delivers the air flow to the rear of the trailer. The exit of upper duct can also be connected to the vertical snorkel duct 284 and can help deliver air to the center of the rear of the vertical surface of the trailer to help reduce the drag force. Like the lower duct 242 air from the exit of the upper duct can be pulled out of the duct by the force of the rear vacuum, thus helping to over come the internal surface drag of the upper duct.

Feature 282 shows the louvers for the upper duct 242. These louvers distribute the air from the upper duct 242 to the rear vertical surface of the trailer to help reduce the rear drag force. The exit of duct 242 is feature 276. These channels 276 channel the air to louvers 278. As air travels through features 242, 276, 278, it starts to experience the pull of the vacuum in the back of the truck. The air is pulled out of these ducts and attempts to overcome the frictional forces on the inside of the duct surfaces. These frictional forces are going to be more irregular, although the compression is going to be less in the upper duct because the upper duct is not going to swallow as much air and is not going to compress it down quite as much as the hard nose of the lower duct. Because of the cargo shape 244, there are irregularities in the configuration this duct 242 and it could be quite constrictive in some loads. Features 278, 282, 286, and 280 may be spherical louvers. All these louvers can be tuned and sphered through experimentation into various shapes as desired. Therefore, the louvers can take on other shapes than those shown in order to do the best job in breaking the eddy currents at the vacuum behind the truck. The eddy currents can be sizeable measure as large as 6 feet in diameter. This system of louvers and vents process the pressurized air passing through these ducts, in connection with the vacuum pulling the air out of these ducts, combine to enable the air behind the truck to flow as a continuous stream rather than forming eddy currents and vacuums. This approach provides considerable savings through reduced drag.

Feature 222A represents the front steering tires of traditional standard width. They are separated and outside of the lower duct so as to be able to perform the steering function. Tires 222A are the two front steering tires and they are standard, traditional tires. They are steerable; they are in some wells that are part of the aerodynamic shape of ducts 220 and 218. They fit into this aerodynamic shape so they can still perform the function of steering. Tires 222B, 222C, 222D and 222E are also shown.

Feature 230A is a hydraulic/N2 gas suspension system with high pressure air bearings. This compact design allows for more space to maximize the lower duct cross-sectional area. The high pressure air bearings allow for greater reduced friction over standard bearings. The bearings can also be standard bearings. Feature 230A is a new hydraulic system of hydraulic shocks and accumulators. It is also a system of hydraulic cylinders, a shock absorber system with springs and also accumulators that allow hydraulic fluid to collapse nitrogen gas bladders. The purpose of this feature is to create space so that the shock absorber system is greatly reduced and the springs have been as greatly reduced so that there is more space to augment and facilitate the large lower duct Features 288A, 288B, 288C, 288D, 288E illustrate hydraulic/N2 gas reservoirs. These are nitrogen hydraulic accumulators and allow the hydraulic piston to go up and down and forces hydraulic fluid at very high pressure, up to 6-10 thousand PSI, to squash a nitrogen gas reservoir or a bladder. The bladder reacts back out as the bladder re-inflates, thus moving the hydraulic fluid back into the cylinder. It is a system for replacing the shocks while creating space and is a space-saving device. Since the general technology is widely known in the art, no more discussion is needed here.

Double wide tires 222B, 222C, 222D, 222E for semi-tractor/trailers greatly reduce the rolling resistance over dual single wide tires. The tractor/trailer preferably has eight double wide tires and two single wide tires 222A rather than eighteen single wide tires. A double wide wheel will open up the necessary space to place additional equipment inside as outlined below (see 254A, 254B, 254C, 254D). This disclosure reduces and 18-wheel tractor/trailer down to ten wheels, eight of them being the new double-wide tires and two being the steerable tires. This alone will reduce the space needed. With one single tire, there's less flexing of the side wall, less rolling resistance. The rolling resistance is combined into one tire so you don't have out of sync rolling resistance in the steel bands. So this is a feature used to provide space for duct work as well and provides for a large wheel hub.

Feature 272 shows the nose cone shaped cab and control instrument location. It can be many different shapes, the aerodynamic shape can be provided in many different ways. The air shedding off the sides of this cab 272 are directed into registers 206. These are the laminar flow registers 206 to receive flow air that cannot pass upward into the upper duct 226 to force them to go through streamlining down the sides. These laminar flow registers 206 typically will be a little larger in width than the other two upper and lower registers 204, 212. The cab 272 contains the instruments, the drive system, and cameras instead of mirrors that stick out and reduce aerodynamic shape. The arrangement provides a system of a screen with four small views so the driver, at a quick glance without moving his or her eyes far off the road, can tell what's on all sides of the truck with four screens.

The operator 208 is positioned in the cab. This shows that the configuration of the driver won't change. The general configuration will not change so that the ergonomics of training the millions of drivers will not be an issue.

The laminar flow cab side registers 206 channel air ambient air pushed laterally away by the forward moving canopy. This register helps reduce eddy currents along the tractor/trailer sides. The air shedding off the sides of this cab are directed into these registers 206 and they take over flow air that cannot pass upward into the upper duct to force them to go through streamlining down the sides.

There is a sleeper and personal area 217 for the operator. It is battery heated.

An equipment compartment 250 stores basic components of a secondary thermodynamic cycle that generates electricity from waste heat from motor exhaust, hydraulic fluid and engine block cooling. This is where most of the equipment is located for the second cycle cooling system that cools the engine, cools the exhaust gas, and cools the hydraulic systems. This relates to an energy recovery system that is generally disclosed in U.S. application Ser. No. 11/132,843, filed May 19, 2005, incorporated herein by reference.

Feature 236 shows aerodynamic surfaces used to bridge the gap between the tractor and the trailer. They reduce aerodynamic friction at highway and freeway speeds, between the tractor and trailer. The surfaces 236 can hinge away at low speeds to allow for articulation between the tractor and trailer. They close that gap and enable the continuous flow of air. They are winglets and hinged on the front end. The surfaces can be gas hinged, gas closed with spring loading and small gas hydraulics, and they are meant to just freely flex with the articulation of the truck. They are not controlled in any specific way and at high speeds they fold down against the two surfaces and form an interval surface to keep the laminar flow as reduced as possible during articulation which can be more than 90 degrees for semi trucks.

Surface 236 have structures on them such that they will automatically swing out like gills with no electronic or remote control, it will just be a mechanically driven process. They will fold and tuck in and adjust their aerodynamic shape at high speeds. Surfaces 236 are different from the 212 and the 204 in that do they streamline air that flows off the front of the truck and down the sides. They streamline air off the windshield and the cab. They open on both sides. They a little wider and a little "dumber," meaning that they are not as controlled and are just for funneling air. They also provide that leading sharp edge. The edges of surfaces 236 will be sharp, thin, wider, and integral.

Feature 228 is the radiator water cooling tank and is part of the lower duct entry 200. This radiator cools for the second cycle equipment (one on each side of the frame). Feature 228 is a lower water tank. More water is retained because the second cycle retains water out of the exhaust and reinjects it into the truck. It's captured and also used in cooling, so there are more places where this truck needs water. Lower radiator tank 228 is preferably integral with 220 but it could be located anywhere. There can be water on the bottom, the top and the sides of the leading edges of duct 220, with the bottom being the larger reservoir. Water continually flows around this mouth of duct 220. Feature 220 is preferably a two walled duct with water in between. There may be a few inches of water on the sides and the top, water is continually circulated around with the bulk of the water being in the bottom. It is used for cooling and it is used in the second cycle for cooling. This is where the energy is dumped for the entire vehicle. Referencing the second cycle incorporated herein, the fans and the radiator surfaces on the second cycle are preferably located here.

Water will circulate around the opening 220. Heat is rejected both internally in the duct 220 and rejected externally. The second cycle takes water transfer down considerably. So this water in this system is much lowered than a traditional radiator. A traditional radiator will have 200 degree fluid in it; this radiator will have fluids 120 or 140 degrees and lower.

This radiator 228 is a much cooler radiator than a standard radiator, it will have some protection. It will circulate air in a way that people can't burn their hands on it on the outside of it, but it will have radiator with bins on the inside of this duct that will be a little hotter but they'll be inside the duct where they'll be protected from people touching it. But this is primarily because the heat is ultimately rejected. An auxiliary engine equipment space (one on each side of the frame) 232 stores auxiliary equipment related to the engine.

Feature 258 is an auxiliary water tank that stores condensed exhaust water for the second cycle process. The tank 258 is used to store captured water from the exhaust condensate in the second cycle concept through a series of chevrons and heat exchanges. The system captures water out of the exhaust.

Feature 254D a hydraulic regenerative braking system that fits inside the furthest rear wheel pairs. This system is computer controlled and generates electricity via hydraulic pumping when activated. It can be differentially turned on relative to the other braking wheel pairs. The double wide tires 222E are 20 inches wide and quite large in diameter and they house a core which is the braking system. It has a hydraulic and a mechanical braking system. Feature 254D comes on before feature 254C. Electronically controls turns on 254D slightly before 254C for stability. Therefore, the rear wheel 222E comes on and then the front wheel 222D comes on. They can turn on together in braking or they can come on separately because there are different modes of stopping. Tires 254B and 254C also have hydraulic braking in them but they are drive flash brakes. In general, the philosophy of the braking is that 254D can come on, then 254C and 154B and finally 254A in order. The operator can have different acceleration curves using this approach. There are different modes of operating this as well. Feature 200A in general describes the tubing of the flow of hydraulic fluid. The drive system for the hydraulic drive is just tubes. It includes hoses and tubes that feed hydraulic fluid to the braking systems and also the hydraulic fluids in the drive system 254B, 254A in the pair of tires. Because of the valving, there are numerous ways, electronically, in which tires can brake and drive according to the conditions of the road.

These conditions would be in long glides or in long downhill grades where a truck has to go into a lower gear. Trucks drivers may switch into lower gears, in this case, the system would just switch into a lower, hydraulic braking which will accumulate energy. Each one of these tires 222B, 222C has a hydraulic braking system 254A, 254B in them that has up to 100 horsepower braking coils; they are essentially electric motors that are driven backwards. These are a combination of hydraulic drive and coils that can generate up to 100 horsepower in braking capability. This means that the 8 tires altogether can provide up to 800 horsepower in braking. These are tightly, custom wound braking systems that are tucked into this large hub, which is now possible because of the size of these tires. So these dual wide tires segway perfectly into providing a cylindrical volume of space. It's a dual braking system, both mechanical and hydraulic electrical generation. So, with 800 horsepower gained from braking, a semi tractor/trailer could slow down in probably 20 seconds or less to stop. That provides almost full braking. There's a safety set of override brakes that are the traditional brakes that are tucked into this same cylinder that can brake by operator override for additional braking, but typically the order would be under control or typical braking.

Feature 254C is a hydraulic regenerative braking system that fits inside the forward rear wheel pairs 222D. This system is computer controlled and generates electricity via hydraulic pumping when activated. It can be differentially engaged relative to the other braking wheel pairs or coordinated with all the brake pairs.

Features 260, 252B, 252C, 252D, 252E are the traditional air brake systems. These semis will still have traditional air brakes. Feature 260 represents an air compressor and is an air tank. Features 252B, 252C, 252D, 252E are located in each one of the wheels. Those are the traditional air brakes that the operator can use to override all electric hydraulic braking recovery systems.

Twin half sized motors 214, rather that one full size motor, are packaged for aerodynamic reasons in the cubic space between the steering tires and the front drive tires. This configuration is also more reliable as one motor can "self-tow" the tractor/trailer in the event one engine fails. Two engines have a better weight to power ratio than one larger equal power engine. Two engines can be operated in independent modes at appropriate times, such as coasting down long grades to save additional fuel. This configuration uses no geared transmissions, but independent hydraulic drives for each wheel, for a net weight savings. Variable power from twin engines can be perfectly blended because the pumped hydraulic fluid from each can be blended with valves and tubing. The configuration placement of these engines makes them more serviceable, as the smaller twin outboard engines, having no geared transmissions, can be quickly disconnected from hydraulic lines and removed from the side of the tractor using jacked dollies.

Feature 244 is the hydraulic pumps attached to each engine. They provide energy transmission in the form of high pressure hydraulic fluid.

They hydraulic 214 makes all this possible. An aspect of the disclosure is a split engine in terms of one engine that has 8 cylinders being 1 split into two 4-cylinder engine blocks. Other number of blocks may be used as well. The engines are physically separated so we have two engines completely separated on either side of the truck and they are either 3, 4 or 6 cylinder systems depending on the horse power that's needed by the truck. There is no limitation on the number of cylinders. FIG. 2B shows a 200 horsepower engine, but it can be anything.

The split engine design lowers the center of gravity. It creates stability in two important ways. One is by changing the weight distribution and number two is the fact that the motor 214 and the hydraulic pump 244 have a relatively smooth activity where the vibration is not nearly as great. This benefits changing gears, the acceleration and deceleration of the truck, the lurching that is associated with traditional driving. These problems go away because of the operational characteristics of hydraulics.

A revival of hydraulics was seen because machinery got bigger and bigger and bigger during World War II and the only way to control large vehicles was with hydraulics 244. The present disclosure primarily uses the hydraulic transmission. Hydraulic transmissions can be mass produced just as cheaply as traditional geared systems. Furthermore, hydraulics have been thought to be not as efficient as geared systems, but that's being proved modernly to not be true because electronic control of hydraulic systems have created analog systems that are nearly just as efficient as gear systems. Geared systems, with every gear change, cause a complete loss of power for a few micro seconds. Integrating all those micro seconds of losses with gear changes adds up to an efficiency that's just as great as a hydraulic system. Hydraulics are really becoming an important aspect of operating. Furthermore, hydraulics with this disclosure segway also into dual use of hydraulics with a braking system allowing the generation of electricity and a shared system of hydraulic tubing which is in 606.

The flow is for the drive system, the motor drives the high pressure, low volume pump 244. Pump 244 picks up hydraulic fluid from the hydraulic fluid storage tank. An immersion primer pump keeps the hydraulic fluid from the hydraulic fluid storage tank and there is immersion primer pump that keeps the hydraulic fluid at a certain number of psi so fluid will flow readily to the devices it needs to and then it takes that fluid out of the pump. Fluid goes into the pump, low pressure fluid comes out, and very high pressure goes into each one of the drives 254B and 254C. The two motors and the two hydraulic pumps can operate independently. The hydraulic drive/regenerative braking system 254B that fits inside the forward drive wheel pairs 222B. This system is computer controlled and drives or brakes the forward drive wheel pair hydraulically. In braking mode electricity is generated.

Features 254A, 254B are hydraulic drives. They have planetary gears and they use high pressure hydraulic fluid from the hydraulic pumps to drive the wheels forward. There is a unique energy saving characteristic of this configuration. In various modes of driving and grade changes, whether the truck is on long grades or flat grades for example, the system depends on the energy required to drive the truck and based on the energy required to maintain the truck speed. Features 254A and 254B can be operated in various ways. The system can put fluid to all four drives or can put fluid to just two of the drives. Furthermore, in certain circumstances, one engine can be shut down. One of the engines can be turned off and the system may provide fluid to just two drives with the one engine. It is an electronically controlled hybrid where the system switches from an electrical motor to a fuel powered motor as it achieves as higher speed. With a traditional semi truck, there is a 6 cylinder 400 horsepower engine that's chugging along and the system cannot turn it off. With the present disclosure, if the truck is on a long ten mile downgrade or even on a flat road, the system controls these engines so that one engine can maintain 65 mph on a flat grade just using one of the two split engines. This helps both on wear and tear through wear leveling and helps with durability. One engine may be used and then the other.

The system may be further enhanced by varying which of the two motors is used just to maintain truck speed to kind of evenly wear them out the system could detect which engine is in better shape or which one is running more efficiently and make decisions between the two for various reasons. The computer system will log all the hours of operation. The computer will have numerous sensors that will log things like number of RPMs, the running rate of torque and those kinds of things. With hydraulics, there is no need for the traditional transmission. Both engines can operate at different RPMs. A control system controls all modules and components in this system. With two hydraulic systems, one hose may be pumping at maybe 70/80 PSI higher than the other ones, maybe a couple hundred PSI higher than the other one. The two fluids will mix perfectly and will join together. The outcome of those two flows will be one fluid at one pressure. Those fluids go through a mixer and come out to impart perfect pressure to both drives on both sides of the vehicle. And then, there will be a planetary gear in that hub also that will allow you to increase the speed. Hydraulics has limited range, but the system includes a planetary gear in there that will allow the driver to step the ratio up a little bit just to get up to those higher speeds. The driver can ride for an hour on one engine and then switch to the other engine on these long hauls and if you encounter a little hill, the system can either turn both engines on or you put fluid to 4 drives instead of 2. This is all seamless. Torque sensors or detectors will be used. It will make it easier to drive. Basic knowledge exists to those of skill in the art. For example, Superdrive, Inc. uses a single hydraulic transmission and control.

Hydraulic fluid flows to the wheels both from the high pressure low volume pump 244 as well as directly from the tank 248. Features 254A, 254B act as drives and generators and can go both ways. So they can take high pressure hydraulic fluid out of the pump, out of the high pressure pump, and drive the vehicle and then dump their fluid back via the lower line or, in a braking sense. In an electrical generation sense, they can take relatively low pressure primed, primed hydraulic fluid out of the top of the tank and generate electricity. That electricity goes onto the grid and back into feature 250 as a second cycle. In the case of 254A and 254B, they act as both drives, mechanical drives, and, reversibly, electrical generators. Now in the case of 254C, 254D, they act just as electrical generators in braking, in hydraulic braking and they're augmented by the traditional air brakes. Their brakes are very responsive and very quick, the brakes that the driver touches the brakes, they get instantaneous performance. Hydraulics react a little slower, but it can increase generation of energy. So, if you go down a long grade or if you know that you're going to be slowing down for a stop sign, the driver can press buttons A, B and C and those are different braking curves. So the driver can quickly select a controlled braking option A, B or C, or even D and set the electro-generation in motion. Or, if needed to react quickly, the driver just steps on the brakes and he gets air brakes.

A hydraulic circulatory system provides branched tubing, halving and tanks to circulate high and low pressure hydraulic fluid to pumps, drives, braking and electrical generation systems. In between the two 606 numbers the figures represent that all the hydraulic system and that no large mechanical differentials and drive lines and universal joints and all that other mechanical equipment that gets in the way. Because when you look at a semi tractor/trailer, it takes a lot of imagination to believe that you can put this duct in there. The hydraulic lines can be below the duct or above the duct or in any other locations or at a mixed position. These hydraulic lines can be anywhere for serviceability, it might be far better for them to be below the ducts, but they also be more prone to damage. They can be on the sides, bottom, and interior of the air ducts in the corners for protectability. There are numerous ways to route them and protect them.

The disclosure now returns to a discussion on the motor 214. In the software for operating the truck, typically a truck driver with Jake Brakes (or equivalent) will use the gears. The driver will either use the gears to slow the truck down or, more sophisticated trucks actually have Jake Brake hydraulics. The driver or a control system turns them all on at once gently, turning them all on hard for hard braking, turning them on in sequence and so forth. There are numerous ways to brake which the software takes care of. But in general, the electrical recovery from this braking is fed into the second cycle compartment where the ultra-capacitors reside. This braking system collects, within a few seconds of braking, huge amounts of energy that is trickled back into the battery charging system, trickled back into electrolysis, trickled back into all the different little pumps, micro pumps and little pump systems that use electricity because this is an all electric hydraulic system. This truck gets away from the traditional mechanical cooling systems such as the fan belt and the fan and that segways perfectly into 600.

Figure 3A:
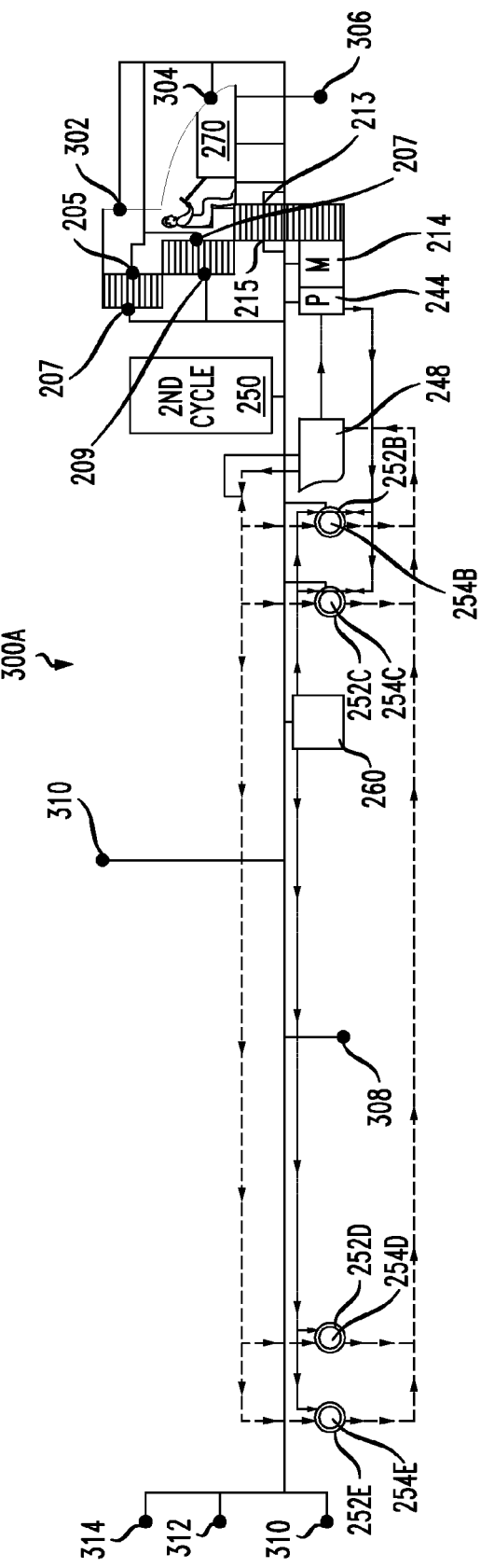
FIG. 3A illustrates a side view including control mechanisms.

FIG. 3A shows fine dotted lines are additional circuits going to the computer 200. Various instrumentations are shown at different locations to detect air pressure and air speed. For example, feature 306 is a sensor within the front lower duct to sense any kinds of physical things we need to know like the air speed of the pressure. Sensors 304 and 302 are positioned in the upper front duct. Sensors 308 and 310 are in the middle of the upper and lower ducts. Rear sensors 310, 312, 314 represent various sensors at various locations in the rear upper duct and the rear snorkel duct and the rear lower duct.

The frame of the truck disclosed herein is a new box frame that enables the lower duct going through the front wheels. The box frame will have to carry all the weight. It will be thicker than the traditional steel box and it includes special features. There will be a continuous frame of two pieces of continuous metal from the front wheels all the way back to the articulation duct.

Details regarding the box frame include that, at the lower part there will be a box and it will twist, widen and arch up over the top of the front wheels. Another box will be formed in front of the front wheels. The box frame will use about the same amount of metal as traditional frames. By getting rid of the gear transmission, the new truck will lose a tremendous amount of weight. Some of this weight will be added back with the drive, the planetary gears, and the hydraulic drive. When mechanics need to fix this truck, the two engines and many components are accessible from the side. The engines will be at approximately knee level. The serviceman could drive up with a motor and a couple of spare wheels and drives and can replace two wheels and an engine on this truck easily. Everything is componentized. This reduces downtime.

Figure 3B:
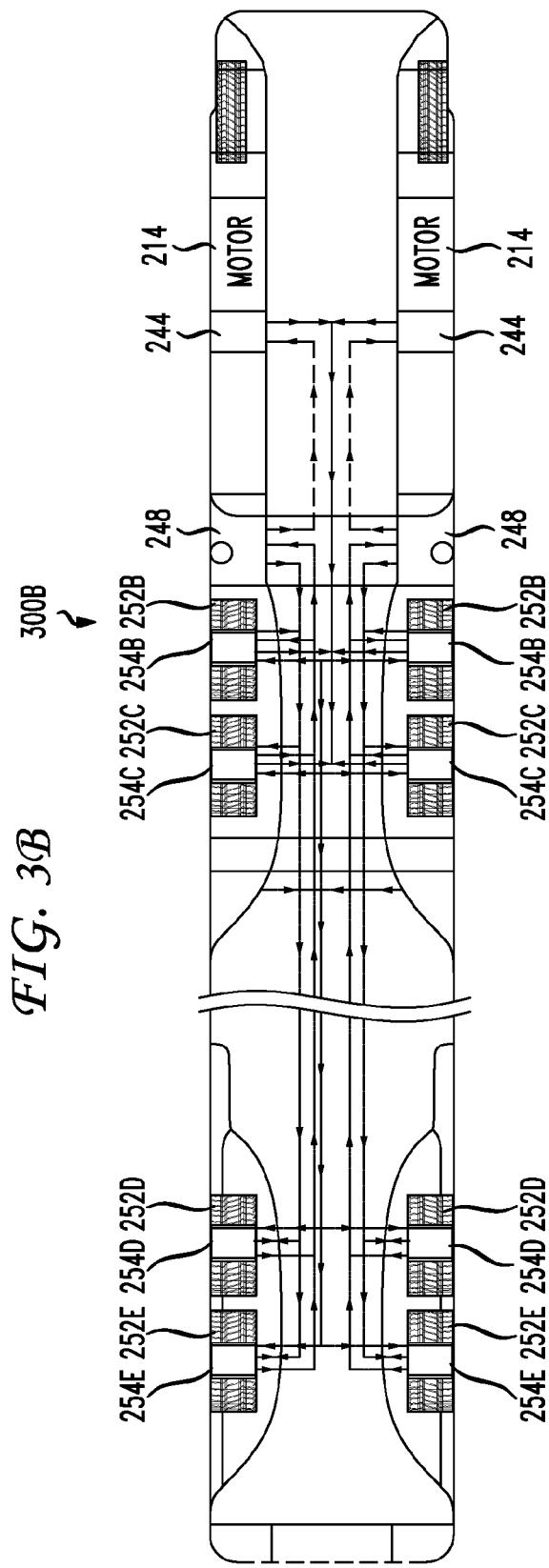
FIG. 3B also illustrates a bottom view with additional control mechanisms.
Figure 4:
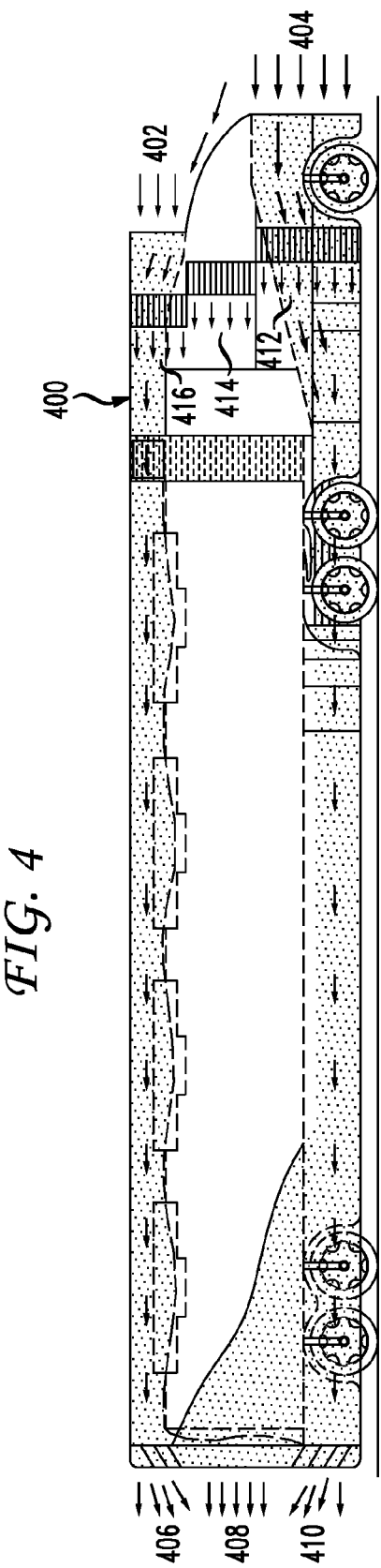
FIG. 4 illustrates aerodynamic flow according to an aspect of the disclosure.

Another aspect of this disclosure relates to a method embodiment. As noted in the side view of FIGS. 3A and 3B, these figures illustrate the basic control and communication systems both electronically and hydraulically between various components. The control system is generally illustrated as Feature 270. As has been noted, this may be any kind of known computing device or other device that may store a computer program for controlling the various functions of the motor, the braking system, the air duct system(s) and any other system that may be computer controlled as would be known by those of skill in the art. Accordingly, a method embodiment of the disclosure may include a step of receiving information from one or more sensors. The sensors may be located as is shown in FIGS. 3A and 3B in various locations such as the front upper duct 302, the front lower duct 306, various points of hydraulic valving, the hydraulic tank and pump 248, the high pressure low volume pump 244, one of the multiple split motors 214, the laminar system 215, 209, 207, the various components of the secondary thermodynamic cycle and hydraulic braking and control and electrical storage system. The sensors may also include sensors at the rear upper duct 314, the rear snorkel duct 312 and the rear lower duct 310. Sensors may be in these locations as well as other locations and receive information such as related to air pressure, air volume, air speed, engine performance, fuel levels, fuel efficiency, information associated with the hydraulic systems including braking and acceleration and so forth. In the context of a split engine configuration where an air duct is positioned between the split engine blocks, the method will involve receiving information from these various sensor systems and providing control signals to the various mechanisms which may be controlled. Accordingly, control signals may be sent to, for example, one or both of the engine blocks wherein they may be alternately turned on or off for fuel efficiency, has been noted the valve control system to control signals may be sent to the various components associated with the 215, 209 and 207 for opening and closing various venting holes which communicate with the interior portions of at least one of the upper and/or lower air ducts. Similarly controlled signals may be sent to one or more of the multiple rear ducting systems to also control the air flow which exits the one or more air ducts. We also note that while a split engine configuration is shown, there may be other configurations in which more engine blocks may be utilized. For example, a system may be implemented wherein four two cylinder engines are positioned in various locations in the vehicle each of which may be separately controlled or controlled in a coordinated manner.

Accordingly, using the general principles above there are various methods which may be identified in terms of controlling the operation of this system. For example, one method may be to receive sensor data from the upper and/or lower ducts regarding pressure and air speed information and based on that information, the computer system may provide control systems to the laminar ducts to increase or decrease the amount of air flow that can leave the upper and/or lower ducts through one or more of the side laminar control systems in order to improve the desired air flow through the upper and/or lower ducts.

Another aspect of the disclosure may be to receive the wireless means such as satellite, cellular or any other known or hereinafter developed wireless communication system for the control system 270 to receive information which may be utilized in making adjustments in the various control systems of the vehicle. For example, a GPS system may be utilized in the control system to be able to receive positional information of the vehicle such that the air pressure or utilization of the engines may be improved. For example, if it is known that the vehicle is coming up upon a steep slope, the system may engage, in an efficient way, both of the split engine blocks or may utilize pressure from one of the stored hydraulic pressure tanks and may make appropriate adjustments in order to most efficiently propel the vehicle up or down a particular slope. Similarly, elevational information may be provided which may cause the control system to vary the positions of one or more of the ducts or laminar ducts in order to accommodate for an elevational parameter.

Similarly, weather information may be received wherein appropriate adjustments may be made based on the existence of condensation. For example, there may be appropriate adjustments that need to be made if there is the existence of or likelihood of the existence of water within the upper and/or lower ducts. For example, there may be other release valves which may provide a mechanism for water which may be found in the upper or lower ducts to be released in the context of the vehicle traveling through rain. In a similar fashion, a release or cleaning mechanism may be used to remove loose debris or creatures like birds, insects, bats, etc. which may be caught in the upper or lower ducts.

There may be other mechanisms which may be utilized for situations where the vehicle is traveling through snow. For example, there may be heating mechanisms which may be employed within the upper and/or lower ducts or in other places to insure the continued controlled flow of air through the system, if ice builds up in any particular location then the system may be able to strategically employ a heating mechanism in order to melt the ice in any particular location. One example of this may be to employ various, separately controlled heating mechanisms which may be positioned at likely locations where water may enter the system and freeze. Frozen water in these positions may alter the flow of air through the duct system. Furthermore, providing heating can lessen the efficiency of the engine. Accordingly, if electrical heating systems are strategically placed in various locations then the system may be able to receive from sensors the location of frozen water within the duct system and only provide energy to the position where the frozen water exists such that wasted energy may not be sent to heating areas where ice does not exist. Accordingly, receiving such information from sensors and providing such control systems will also be generally coordinated by the computer system 270. Another contemplated mechanism to assist in such a situation would be to provide easy access through openable side panels along the various duct systems such that one may easily be able to open up a side panel and have access to the upper and/or lower duct such that they can also be manually cleaned if necessary.

Another aspect of the disclosure may be that the upper duct 242 and the canvas or flexible material, which may be lowered from the ceiling and which generally may sit on top of the cargo, may be dynamically adjustable. In this regard, there may be various sensors placed throughout the upper duct such that air pressure and air flow may be monitored and inasmuch as this canvas covering may be dropped down in order to define the upper duct, the same mechanical system that is used to drop that system down may also be used to variably adjust that duct such that it may become wider or narrower depending upon the needs of the system to maximize the air flow through the system. Furthermore, it may be adjustable in various locations. Therefore, the front portion of the duct may be adjusted such that it's narrower and the rear portion may be wider if such a control of air system may be needed in order to maximize air flow through the system.

Another embodiment of the disclosure comprises a computer readable medium. This may be a hard drive, a tape drive, a CD or any known physical medium that stores a computer program for controlling a computing system to provide signaling to control the various mechanisms as disclosed herein.

Unless expressly defined in the claims, such computer readable medium does not cover an electrical signal that exists in the medium of air but is limited to a physical computer readable medium. One aspect of the disclosure, if possible to claim, is the generation of such a signal, however, unless claimed in this manner it is not included in the scope of the claims.

Another aspect of this disclosure will also include an interactive system for the driver. In this regard, there may be presented to the driver various images perhaps preferably on a touch sensitive screen where the driver may be able to view a visual presentation of the efficiency of the engine. For example, an image similar to that shown in FIG. 4 may be utilized as well as other presentations generally of various images where the driver can monitor the efficiency of the air flow and the hydraulic systems and the other systems in the truck. For example, the illustration of air may be color coded. For example, if the system chooses blue to illustrate efficient air flow, then the driver could see areas of the air ducts where it is shown to be blue and if there are other areas of the air duct where the sensors indicate that the air flow is less than efficient, given parameters such as the wind speed and the velocity of the vehicle and so forth, then the driver may be able to see where problems may exist. This may apply to situations where, for example, if the driver notices that less than efficient air flow is found in the lower duct and the weather is cold and freezing such that the driver may suspect that ice is building up in a particular location. At the next stop the driver may be able to (if there is no automatic heating system) open up a side panel and remove ice at a location within the system where the air flow is less than perfect and be able to improve that air flow for further fuel efficiency going on down the road. Accordingly, an aspect of this disclosure is presenting data based on the various sensor and other information to a driver such that the driver may be able to both monitor and also make decision regarding the functionality of the various systems. Furthermore, another aspect of the disclosure would be to transmit such data, either real time or with a latency factor, to a control center where the operation of the vehicle may be monitored and where automatic or manual decisions may be made regarding any of the control elements of the system. Such information may be also received from a fleet of vehicles such that an aggregate report may be made wherein the system can identify, generally, where problems may exist within the vehicles. In this regard, feedback data may be received to make improvements in the air flow system. For example, if 100 vehicles often illustrate that there are particular locations within the upper and/or lower duct where less than efficient air flow commonly exists then such a phenomenon may be studied in the aggregate such that in future vehicles or in current vehicles there may be opportunities for improvement. Accordingly, a central computing system may be utilized which receives wirelessly or as trucks travel through various transceiver locations when the data may be collected. For example, the computing system 220 of the truck may store and accumulate data associated with the vehicle as it travels down the road and it's in various locations. That data may be then downloaded as the truck moves through a metropolitan area where the owner has positions where a wireless communication link can be established and the data can be downloaded and then compiled. Accordingly, general opportunities which will be known to those of skill in the art will be made available in terms of data, communication, presentation and analysis in the context of this vehicle that has a split engine block with one or more air flow ducts and a hydraulic transmission system.

An aspect of this disclosure is to remove the mirrors and utilize video cameras that can present a display to the driver of various views. One or more cameras may also be placed in various locations within the duct system to view the air flow and whether there is ice or other debris in the system. The system also handles bugs and so forth that may enter the duct system. There may be anti stick coatings or plastic liners that may be placed at various locations for preventing objects from sticking. These may be removable and able to be easily replaced.

I claim:

1. A vehicle comprising:
    a first portion having a lower first portion duct that receives first air from a front of the first portion and channels the first air between a set of rear wheels;
    laminar flow registers positioned on each side of the first portion, wherein the laminar flow registers process overflow air from the lower first portion duct and channel the air down a side of the first portion in a laminar flow, wherein the laminar flow registers are adjustable based on one of vehicle speed and air pressure;
    a second portion having a lower second portion duct positioned below a cargo space and that channels the first air in the lower second portion duct between each set of second portion rear wheels; and
    a lower articulation duct positioned near the set of rear wheels in the first portion that receives air from the lower first portion duct and communicates air to the lower second portion duct.

2. The vehicle of claim 1, wherein the laminar flow registers are automatically adjusted for vehicle speed and air pressure.

3. The vehicle of claim 1, further comprising:
    a sensor for detecting air conditions; and
    a processor for adjusting the laminar flow registers based on the air conditions.

4. The vehicle of claim 3, wherein the sensor is configured to detect at least one of an air pressure, an air flow, and a temperature.

5. The vehicle of claim 1, wherein the lower first portion duct is unobstructed such that air received in the lower first portion duct is compressed in a laminar flow.

6. The vehicle of claim 1, wherein the lower articulation duct adjusts as the first portion turns.

7. The vehicle of claim 1, further comprising an upper first portion duct, an upper articulation duct and an upper second portion duct, wherein the upper first portion duct receives second air at a top portion of the first portion and communicates the second air to the upper articulation duct, which communicates the air to the upper second portion duct.

8. The vehicle of claim 1, further comprising two engines each positioned on a side of the lower first portion duct.

9. The vehicle of claim 8, wherein each of the two engines has a hydraulic transmission.

10. The vehicle of claim 1, wherein the laminar flow registers are controlled by a control system.

11. The vehicle of claim 1, further comprising a louver at a rear of the second portion that receives the first air from the lower second portion duct and channels the first air to a rear portion of the second portion.

12. The vehicle of claim 1, further comprising an aerodynamic operators cab canopy that forces ambient air up and around the aerodynamic operators cab canopy.

13. The vehicle of claim 1, wherein the laminar flow registers process overflow air from an upper first portion duct that receives second air at a top portion of the first portion and communicates the second air to an upper articulation duct, which communicates the second air to an upper second portion duct.

14. The vehicle of claim 1, further comprising two engine blocks that are physically separated and positioned on a left portion and a right portion of a cab.

15. The vehicle of claim 1, wherein each of the two engine blocks drives a hydraulic pump.

16. The vehicle of claim 1, wherein the lower first portion duct further comprises a square duct with aerodynamic leading edges.

17. The vehicle of claim 1, wherein the lower first portion duct is completely enclosed to enable the first air to become pressurized in the lower first portion duct.

18. The vehicle of claim 1, wherein the lower first portion duct forms a structural member to support a set of drive tires.

19. The vehicle of claim 1, wherein the laminar flow registers process overflow air from the lower articulation duct.

20. The vehicle of claim 1, wherein the laminar flow registers process overflow air from the lower second portion duct.

* * * * *